US010432720B1

(12) United States Patent
Shavell et al.

(10) Patent No.: US 10,432,720 B1
(45) Date of Patent: Oct. 1, 2019

(54) SYSTEMS AND METHODS FOR STRONG INFORMATION ABOUT TRANSMISSION CONTROL PROTOCOL CONNECTIONS

(71) Applicant: Symantec Corporation, Mountain View, CA (US)

(72) Inventors: Michael Shavell, Merrimack, NH (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 720 days.

(21) Appl. No.: 14/314,263

(22) Filed: Jun. 25, 2014

(51) Int. Cl.
*G06F 15/16* (2006.01)
*H04L 29/08* (2006.01)
*H04L 29/06* (2006.01)

(52) U.S. Cl.
CPC .......... *H04L 67/1097* (2013.01); *H04L 69/16* (2013.01)

(58) Field of Classification Search
CPC .......................... H04L 69/161; H04L 67/1097
See application file for complete search history.

(56) References Cited

U.S. PATENT DOCUMENTS

| 7,015,811 | B2 | 3/2006 | Decker et al. |
| 7,673,074 | B1 * | 3/2010 | Sebastian ................ H04L 69/16 370/401 |
| 7,861,300 | B2 | 12/2010 | Arnold et al. |
| 8,104,090 | B1 | 1/2012 | Pavlyushchik |
| 8,117,322 | B1 * | 2/2012 | McQuade ................ H04L 67/02 709/219 |
| 8,126,891 | B2 | 2/2012 | Laxman et al. |
| 8,341,745 | B1 | 12/2012 | Chau et al. |
| 8,544,087 | B1 | 9/2013 | Eskin et al. |

(Continued)

FOREIGN PATENT DOCUMENTS

| CN | 102571469 A | 7/2012 |
| CN | 102893289 A | 1/2013 |
| EP | 2515250 A1 | 10/2012 |

OTHER PUBLICATIONS

Mahoney, Network traffic anomaly detection based on packet bytes, Proceedings of the 2003 ACM symposium on Applied computing, pp. 346-350, Mar. 9, 2003.

(Continued)

*Primary Examiner* — Moustafa M Meky
*Assistant Examiner* — Sm Z Islam
(74) *Attorney, Agent, or Firm* — FisherBroyles, LLP

(57) ABSTRACT

The disclosed computer-implemented method for storing information about transmission control protocol connections may include (1) configuring a server with a transmission control protocol stack that is an alternative to a default transmission control protocol stack of an operating system of the server, (2) receiving, at the server, a request to establish a transmission control protocol connection with the server, (3) routing the request through the alternative transmission control protocol stack instead of the default transmission control protocol stack, and (4) storing, at the server via the alternative transmission control protocol stack, connection information about the transmission control protocol connection that excludes at least one item of information that would be stored by the default transmission control protocol stack. Various other methods, systems, and computer-readable media are also disclosed.

20 Claims, 7 Drawing Sheets

(56) References Cited

U.S. PATENT DOCUMENTS

| | | | |
|---|---|---|---|
| 8,566,938 B1 | 10/2013 | Prakash et al. | |
| 8,925,037 B2 | 12/2014 | Marino et al. | |
| 8,973,133 B1 | 3/2015 | Cooley | |
| 9,053,516 B2 | 6/2015 | Stempora | |
| 9,088,560 B1 | 7/2015 | Newstadt et al. | |
| 9,141,790 B2 | 9/2015 | Roundy et al. | |
| 9,148,441 B1 | 9/2015 | Tamersoy et al. | |
| 9,166,997 B1 | 10/2015 | Guo et al. | |
| 9,256,739 B1 | 2/2016 | Roundy et al. | |
| 9,332,030 B1 | 5/2016 | Pereira | |
| 9,384,066 B1 | 7/2016 | Leita et al. | |
| 9,473,380 B1 | 10/2016 | Bermudez et al. | |
| 9,529,990 B2 | 12/2016 | Newstadt et al. | |
| 9,582,669 B1 | 2/2017 | Shen et al. | |
| 2002/0124089 A1* | 9/2002 | Aiken, Jr. | H04L 29/06 709/227 |
| 2003/0074474 A1* | 4/2003 | Roach | H04L 29/06 709/246 |
| 2004/0059822 A1* | 3/2004 | Jiang | H04L 67/1097 709/230 |
| 2005/0030969 A1 | 2/2005 | Fredriksson | |
| 2005/0138413 A1 | 6/2005 | Lippmann et al. | |
| 2006/0095573 A1* | 5/2006 | Carle | H04L 63/02 709/227 |
| 2006/0236374 A1 | 10/2006 | Hartman | |
| 2008/0088408 A1* | 4/2008 | Backman | H04L 69/16 340/2.23 |
| 2008/0134327 A1 | 6/2008 | Bharrat et al. | |
| 2009/0144308 A1 | 6/2009 | Huie et al. | |
| 2009/0157365 A1 | 6/2009 | Higuchi et al. | |
| 2010/0186088 A1 | 7/2010 | Banerjee et al. | |
| 2010/0192226 A1 | 7/2010 | Noel et al. | |
| 2010/0235879 A1 | 9/2010 | Burnside et al. | |
| 2011/0019774 A1* | 1/2011 | Furuta | G06F 8/65 375/340 |
| 2011/0047620 A1 | 2/2011 | Mahaffey et al. | |
| 2011/0083180 A1 | 4/2011 | Mashevsky et al. | |
| 2011/0302656 A1 | 12/2011 | El-Moussa | |
| 2011/0314546 A1 | 12/2011 | Aziz et al. | |
| 2011/0320617 A1 | 12/2011 | Annamalaisami et al. | |
| 2012/0144468 A1 | 6/2012 | Pratt et al. | |
| 2012/0233683 A1 | 9/2012 | Ibrahim et al. | |
| 2013/0031037 A1 | 1/2013 | Brandt et al. | |
| 2013/0042294 A1 | 2/2013 | Colvin et al. | |
| 2013/0212659 A1 | 8/2013 | Maher et al. | |
| 2013/0333032 A1 | 12/2013 | Delatorre et al. | |
| 2014/0150094 A1* | 5/2014 | Rao | H04L 63/1458 726/22 |
| 2014/0226664 A1* | 8/2014 | Chen | H04L 61/2589 370/392 |
| 2014/0258379 A1* | 9/2014 | L'Heureux | H04L 67/10 709/203 |
| 2014/0330977 A1* | 11/2014 | van Bemmel | H04L 69/22 709/226 |
| 2014/0365646 A1 | 12/2014 | Xiong | |
| 2015/0113638 A1 | 4/2015 | Valasek et al. | |
| 2015/0150124 A1 | 5/2015 | Zhang et al. | |
| 2015/0261655 A1 | 9/2015 | Versteeg et al. | |
| 2015/0281047 A1* | 10/2015 | Raju | H04L 49/70 709/244 |
| 2016/0261482 A1 | 9/2016 | Mixer et al. | |
| 2017/0118234 A1 | 4/2017 | Arora et al. | |

OTHER PUBLICATIONS

Balthrop et al., Revisiting LISYS: Parameters and Normal Behavior, Proceedings of the 2002 Congress on Evolutionary Computation, pp. 1045-1050, May 12, 2002.

Lee et al., Data mining approaches for intrusion detection, Proceedings of the 7th conference on USENIX Security Symposium—vol. 7, p. 6, Jan. 26, 1998.

Clifton et al., Developing custom intrusion detection filters using data mining, MILCOM 2000. 21st Century Military Communications Conference Proceedings, vol. 1, pp. 440-443, Oct. 22, 2000.

Bloedorn et al., Data Mining for Improving Intrusion Detection, http://www.mitre.org/sites/default/files/pdf/bloedorn_spss.pdf, Sep. 18, 2015.

Lee et al., Information-theoretic measures for anomaly detection, 2001 IEEE Symposium on Security and Privacy, pp. 130-143, May 13, 2001.

Yang et al., Anomaly detection and diagnosis in grid environments, Proceedings of the 2007 ACM/IEEE conference on Supercomputing, p. 33, Nov. 10, 2007.

Wang et al., Anomalous Payload-Based Network Intrusion Detection, Seventh International Workshop on Recent Advances in Intrusion Detection, pp. 203-222, Sep. 15, 2004.

Dussel et al., Cyber-Critical Infrastructure Protection Using Real-Time Payload-Based Anomaly Detection, 4th International Workshop on Critical Information Infrastructures Security, pp. 85-97, Sep. 30, 2009.

Tongaonkar et al., Towards self adaptive network traffic classification, Computer Communications, vol. 56, pp. 35-46, Feb. 1, 2015.

Bermudez et al., Automatic protocol field inference for deeper protocol understanding, IFIP Networking Conference (IFIP Networking), 2015, pp. 1-9, May 20, 2015.

Taylor et al., Frequency-based anomaly detection for the automotive CAN bus, 2015 World Congress on Industrial Control Systems Security (WCICS), pp. 45-49, Dec. 14, 2015.

Theissler, Anomaly detection in recordings from in-vehicle networks. pdf, Big Data Applications and Principles, First International Workshop, BIGDAP 2014, Madrid, Spain, Sep. 11, 2014.

Muter et al., A structured approach to anomaly detection for in-vehicle networks, 2010 Sixth International Conference on Information Assurance and Security (IAS), Atlanta, GA, pp. 92-98, Aug. 23, 2010.

Kleberger; Security Aspects of the In-Vehicle Network in the Connected Car; Intelligent Vehicles Symposium (IV), 2011 IEEE, Baden-Baden, Germany, reference: pp. 528-533, Jun. 5-9, 2011.

Muter; Entropy-based anomaly detection for in-vehicle networks; 2011 IEEE Intelligent Vehicles Symposium (IV), DOI: 10.1109/IVS.2011.5940552, Baden-Baden, Germany, reference: pp. 1110-1115, Jun. 5-9, 2011.

Bayer; Automotive Security Testing—The Digital Crash Test; http://www.sia.fr/images/images/Image/Evenements/2014/CESA/available%20papers/09_Bayer_Escrypt.pdf, as accessed Feb. 9, 2015; 3rd CESA Automotive Electronics Congress (CESA 3.0), Paris, France, Dec. 3-4, 2014.

Ben Othmane; Towards Extended Safety in Connected Vehicles; Proceedings of the 16th International IEEE Annual Conference on Intelligent Transportation Systems (ITSC 2013), The Hague, The Netherlands, Oct. 6-9, 2013.

Bourns Type 6002 Non-contacting Steering Angle Sensor; http://www.we-conect.com/cms/media/uploads/events/415/dokumente/Bourns_-_Non-Contacting_Steering_Angle_Sensor_Type_6002.pdf, as accessed Aug. 29, 2014, On or before Aug. 29, 2014.

CAN protocol specification; http://www.can-cia.org/index.php?id=164, as accessed Aug. 29, 2014, Oct. 17, 2010.

Controller Area Network (CAN) Overview; http://www.ni.com/white-paper/2732/en/, as accessed Aug. 29, 2014; National Instruments Corporation, Aug. 1, 2014.

Driver Feedback; https://play.google.com/store/apps/details?id=com.statefarm.driverfeedback, as accessed Aug. 29, 2014; State Farm Insurance, Android Apps on Google Play, Jun. 2, 2013.

Electronic control unit; https://en.wikipedia.org/wiki/Electronic_control_unit, as accessed Feb. 9, 2015; Wikipedia, Jul. 28, 2004.

EMI/ESD Protection Solutions for the CAN Bus; http://www.onsemi.com/pub_link/Collateral/AND8169-D.PDF, as accessed Aug. 29, 2014; Publication Order No. AND8169/D, on Semiconductor, Semiconductor Components Industries, LLC, Jun. 2014—Rev. 2.

Emulation; https://en.wikipedia.org/wiki/Emulation, as accessed Feb. 9, 2015; Wikipedia, Dec. 3, 2003.

FlexRay Automotive Communication Bus Overview; http://www.ni.com/white-paper/3352/en/, as accessed Aug. 29, 2014; National Instruments Corporation, Aug. 21, 2009.

(56) References Cited

OTHER PUBLICATIONS

Hardware emulation; https://en.wikipedia.org/wiki/Hardware_emulation, as accessed Feb. 9, 2015; Wikipedia, Sep. 13, 2006.
Koscher; Experimental Security Analysis of a Modern Automobile; http://www.autosec.org/pubs/cars-oakland2010.pdf, as accessed Feb. 9, 2015; 2010 IEEE Symposium on Security and Privacy, 2010.
Lepkowski; EMI/ESD protection solutions for the CAN bus; http://www.can-cia.org/fileadmin/cia/files/icc/10/cia_paper_lepkowski.pdf, as accessed Aug. 29, 2014; iCC 2005, CAN in Automation, 2005.
Miller; A Survey of Remote Automotive Attack Surfaces; http://www.ioactive.com/pdfs/Remote_Automotive_Attack_Surfaces.pdf, as accessed Aug. 29, 2014; Black Hat USA 2014, Las Vegas, NV, Aug. 2-7, 2014.
Nathan Evans, et al; Systems and Methods for Detecting Anomalous Messages in Automobile Networks; U.S. Appl. No. 14/525,792, filed Oct. 28, 2014.
Nathan Evans, et al; Systems and Methods for Evaluating Electronic Control Units Within Vehicle Emulations; U.S. Appl. No. 14/671,036, filed Mar. 27, 2015.
Regev; Automotive Ethernet Security Testing; http://standards.ieee.org/events/automotive/2014/20_Automotive_Ethernet_Security_Testing.pdf, as accessed Feb. 9, 2015, 2014.
Snapshot; https://www.progressive.com/auto/snapshot/, as accessed Aug. 29, 2014; Progressive Casualty Insurance Company, Mar. 8, 2013.
Vehicle bus; https://en.wikipedia.org/wiki/Vehicle_bus, as accessed Feb. 9, 2015; Wikipedia, May 12, 2005.
Volvo tests Cloud-based V2V ice warning concept; http://telematicsnews.info/2014/03/19/volvo-tests-cloud-based-v2v-ice-warning-sharing_m5202/, as accessed Aug. 29, 2014; Telematics News, Mar. 19, 2014.
Wolf; Security in Automotive Bus Systems; http://www.weika.eu/papers/WolfEtAl_SecureBus.pdf, as accessed Aug. 29, 2014, 2004.
Yun Shen, et al; Systems and Methods for Detecting Discrepancies in Automobile-Network Data; U.S. Appl. No. 14/525,715, filed Oct. 28, 2014.
Bajpai, et al; Systems and Methods for Detecting Suspicious Microcontroller Messages; U.S. Appl. No. 15/143,284, filed Apr. 29, 2016.
Michael Pukish, et al; Systems and Methods for Detecting Transactional Message Sequences That Are Obscured in Multicast Communications; U.S. Appl. No. 15/194,337, filed Jun. 27, 2016.
Adam Glick, et al.; Systems and Methods for User-Directed Malware Remediation; U.S. Appl. No. 13/419,360, filed Mar. 13, 2012.
Carey Nachenberg, et al.; Systems and Methods for Neutralizing File-Format-Specific Exploits Included Within Files Contained Within Electronic Communications; U.S. Appl. No. 13/418,332, filed Mar. 12, 2012.
Leylya Yumer, et al.; Systems and Methods for Analyzing Zero-Day Attacks; U.S. Appl. No. 13/901,977, filed May 24, 2013.
Kyumin Lee, et al.; Content-Driven Detection of Campaigns in Social Media; CIKM'11; Oct. 24-28, 2011; ACM; Glasgow, Scotland, UK; http://faculty.cs.tamu.edu/caverlee/pubs/lee11cikm.pdf, as accessed Aug. 8, 2013.
Monowar H. Bhuyan, et al.; AOCD: An Adaptive Outlier Based Coordinated Scan Detection Approach; International Journal of Network Security; Nov. 2012; pp. 339-351; vol. 14, No. 6; http://www.cs.uccs.edu/~jkalita/papers/2012/BhuyanMonowarIJNS2012.pdf, as accessed Aug. 8, 2013.
William Eberle, et al., Graph-based approaches to insider threat detection; CSIIRW '09 Proceedings of the 5th Annual Workshop on Cyber Security and Information Intelligence Research: Cyber Security and Information Intelligence Challenges and Strategies; 2009; Article No. 44; ACM; http://dl.acm.org/citation.cfm?id=1558658, as accessed Aug. 8, 2013.
Splunk, Inc.; Detecting Advanced Persistent Threats—Using Splunk for APT; Jan. 4, 2012; Tech Brief; http://www.splunk.com/web_assets/pdfs/secure/Splunk_for_APT_Tech_Brief.pdf, as accessed Aug. 8, 2013.
Triumfant, Inc.; Detecting the Advanced Persistent Threat; Nov. 30, 2010; www.triumfant.com/advanced_persistent_threat.asp, as accessed Aug. 8, 2013.
EMC Corporation; Advanced Persistent Threat (APT) and Rootkit Detection; 2012; http://www.siliciumsecurity.com/advanced-persistent-threats-and-rootkits-detection/, as accessed Aug. 8, 2013.
Fanglu Guo, et al; Systems and Methods for Reducing False Positives When Using Event-Correlation Graphs to Detect Attacks on Computing Systems; U.S. Appl. No. 14/031,044, filed Sep. 19, 2013.
Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004), 138-142.
Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.
Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.
Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.
Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).
Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.
Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).
Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.
Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.
Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.
Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).
Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.

(56) References Cited

OTHER PUBLICATIONS

Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008), 173-187.
Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).
Wang, Ting et al., "Microscopic Social Influence", http://www.cc.gatech.edu/~lingliu/papers/2012/TingWang-SDM2012.pdf, as accessed Nov. 13, 2013, SDM 2012, (2012).
Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).
Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.
Bruce McCorkendale, et al; Systems and Methods for Detecting Malware; U.S. Appl. No. 13/422,702, filed Mar. 16, 2012.
Acar Tamersoy, et al; Systems and Methods for Adjusting Suspiciousness Scores in Event-Correlation Graphs; U.S. Appl. No. 14/138,891, filed Dec. 23, 2013.
Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).
"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).
"Advanced Persistent Threat (APT) Attack & Zero-Day Protection", http://www.fireeye.com/, as accessed Feb. 6, 2014, Fire Eye, Inc., (2006).
"Advanced Threat Defense", http://www.fidelissecurity.com/advanced-persistent-threat-protection, as accessed Feb. 6, 2014, General Dynamics Fidelis Cybersecurity Solutions, Inc., (2013).
"Mandiant for Security Operations", https://www.mandiant.com/products/mandiant-platform/security-operations, as accessed Feb. 6, 2014, Mandiant, A FireEye Company, (Mar. 1, 2013).
"Mandiant for Intelligent Response", http://www.mandiant.com/products/mandiant-platform/intelligent-response, as accessed Feb. 6, 2014, Mandiant, A FireEye Company, (Mar. 1, 2013).
"Solera Networks Inc.", http://www.soleranetworks.com/, as accessed Feb. 6, 2014, (Feb. 16, 2005).
"LogRhythm, Inc.", http://www.logrhythm.com/, as accessed Feb. 6, 2014, (Oct. 18, 2000).
Kevin Alejandro Roundy, et al; Systems and Methods for Using Event-Correlation Graphs to Generate Remediation Procedures; U.S. Appl. No. 14/221,703, filed Mar. 21, 2014.
Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).
Constantin, Lucian, "Attackers used known exploit to steal customer log-in credentials, vBulletin maker says", http://www.networkworid.com/article/2171967/access-control/attackers-used-known-exploit-to-steal-customer-log-in-credentials--vbulletin-maker-sa.html, IDG News Service, Network World, (Nov. 18, 2013).
"Recovery Manager for Active Directory Forest Edition", http://software.dell.com/documents/recovery-manager-for-active-directory-forest-edition-datasheet-26622.pdf, Dell, Inc., (Nov. 2013).
Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).
Dezert, Jean et al., "On the Validity of Dempster-Shafer Theory", Fusion 2012—15th International Conference on Information Fusion, Singapour, Singapore, (Jul. 2012).
Kevin Roundy, et al; Systems and Methods for Using Event-Correlation Graphs to Detect Attacks on Computing Systems; U.S. Appl. No. 14/041,762, filed Sep. 30, 2013.
Ilya Sokolov, et al; Systems and Methods for Notifying Contacts About the Status of Persons Impacted by Significant Unforeseen Events; U.S. Appl. No. 14/525,244, filed Oct. 28, 2014.
"Google now", http://www.google.com/landing/now/#whatisit, as accessed Aug. 28, 2014, (Jun. 28, 2012).
"Bing Maps", http://www.bing.com/maps/, as accessed Aug. 28, 2014, (Jun. 11, 2009).
"Google Now", https://plus.google.com/+google/posts/WhNRboMLynU, as accessed Aug. 18, 2015, (Mar. 29, 2014).
Keith Newstadt, et al; Systems and Methods for Validating Login Attempts Based on User Location; U.S. Appl. No. 14/197,687, filed Mar. 5, 2014.
Keith Newstadt; Systems and Methods for Validating Login Attempts Based on User Location; U.S. Appl. No. 14/735,195, filed Jun. 10, 2015.
Michael Shavell, et al; Systems and Methods for Storing Information About Transmission Control Protocol Connections; U.S. Appl. No. 14/314,263, filed Jun. 25, 2014.
Haas, Juergen; SYN flood; http://linux.about.com/cs/linux101/g/synflood.htm, as accessed Jul. 10, 2014; About.com.
Shane Pereira; Systems and Methods for Thwarting Illegitimate Initialization Attempts; U.S. Appl. No. 14/485,287, filed Sep. 12, 2014.
Hobgood, et al., Advanced Automatic Crash Notifications and, Urgency Factors: Can We Standardize?, APCO 2011, PowerPoint Slides, Jul. 22, 2012.
Asi, et al., Black Box System Design, Dec. 14, 2010.
Ignacio Bermudez Corrales, et al; Systems and Methods for Identifying Compromised Devices Within Industrial Control Systems; U.S. Appl. No. 14/952,344, filed Nov. 25, 2015.
Bolzoni; Poseidon: a 2-tier Anomaly-based Intrusion Detection System; http://doc.utwente.nl/54544/1/00000150.pdf, as accessed Sep. 29, 2015; International Workshop on Information Assurance, IEEE, London.
Caselli; Sequence-aware Intrusion Detection in Industrial Control Systems; CPSS'15, Proceedings of the 1st ACM Workshop on Cyber-Physical System Security, 2015.
Cisco Anomaly Guard Module; http://www.cisco.com/c/en/us/products/collateral/interfaces-modules/catalyst-6500-7600-router-anomaly-guard-module/product_data_sheet0900aecd80220a7c.html, as accessed Sep. 29, 2015; Document ID1457308823644728.
Distributed control system; https://en.wikipedia.org/wiki/Distributed_control_system, as accessed Sep. 29, 2015; Wikipedia.
Garitano; A Review of SCADA Anomaly Detection Systems; Advances in Intelligent and Soft Computing, 2016.
Ginter; Experience with Network Anomaly Detection on Industrial Networks; Industrial Control Systems Joint Working Group (ICSJWG), 2010.
Hadziosmanovi; N-Gram against the Machine: On the Feasibility of the N-Gram Network Analysis for Binary Protocols; Research in Attacks, Intrusions, and Defenses. 2012.
Kiss; Data Clustering-based Anomaly Detection in Industrial Control Systems; Intelligent Computer Communication and Processing, IEEE. 2014.
Mahoney; PHAD: Packet Header Anomaly Detection for Identifying Hostile Network Traffic; https://cs.fit.edu/~mmahoney/paper3.pdf, as accessed Sep. 29, 2015.
Mantere; Network Traffic Features for Anomaly Detection in Specific Industrial Control System Network; Future Internet 2013, vol. 5 (6), MDPI.
Perdisci; McPAD : A Multiple Classifier System for Accurate Payload-based Anomaly Detection; https://pralab.diee.unica.it/sites/

(56) References Cited

OTHER PUBLICATIONS default/files/Perdisci_COMNET2009.pdf, as accessed Sep. 29, 2015; Computer Networks, vol. 53, Issue 6.
Snort (software); https://en.wikipedia.org/wiki/Snort_(software), as accessed Sep. 29, 2015; Wikipedia.
The Bro Network Security Monitor; https://www.bro.org/, as accessed Sep. 29, 2015.
Wang; Anagram: A Content Anomaly Detector Resistant to Mimicry Attack; https://mice.cs.columbia.edu/getTechreport.php?techreportID=403&format=pdf&, as accessed Sep. 29, 2015; Recent Advances in Intrusion Detection.
Wang; Anomalous Payload-based Network Intrusion Detection; http://www.covert.io/research-papers/security/PAYL%20-%20Anomalous%20Payload-based%20Network%20Intrusion%20Detection.pdf, as accessed Sep. 29, 2015; Recent Advances in Intrusion Detection.
Walter Bogorad; Systems and Methods for Detecting Anomalies That Are Potentially Indicative of Malicious Attacks; U.S. Appl. No. 15/059,326, filed Mar. 3, 2016.
Aggarwal; Outlier Analysis; http://www.springer.com/us/book/9781461463955, as accessed Feb. 1, 2016, (2013).
Dunning; Practical Machine Learning: A New Look At Anomaly Detection; https://www.mapr.com/practical-machine-learning-new-look-anomaly-detection, as accessed Feb. 1, 2016, (Jul. 21, 2014).
Kind; Histogram-based traffic anomaly detection; http://ieeexplore.ieee.org/document/5374831/?arnumber=5374831, as accessed Feb. 1, 2016; IEEE Transactions on Network and Service Management, vol. 6, Issue 2, (Jun. 2009).
Wang; Network anomaly detection: A survey and comparative analysis of stochastic and deterministic methods; http://ieeexplore.ieee.org/document/6759879/?arnumber=6759879, as accessed Feb. 1, 2016; 2013 IEEE 52nd Annual Conference on Decision and Control (CDC), (Dec. 10-13, 2013).
Yolacan; Learning From Sequential Data for Anomaly Detection; https://repository.library.northeastern.edu/downloads/neu:349795, as accessed Feb. 1, 2016; Dissertation, (Oct. 2014).
Michael Sylvester Pukish, et al; Systems and Methods for Detecting Obscure Cyclic Application-Layer Message Sequences in Transport-Layer Message Sequences; U.S. Appl. No. 15/271,494, filed Sep. 21, 2016.
K. Nyalkalkar et al., "A comparative study of two network-based anomaly detection methods," in 2011 Proceedings IEEE INFOCOM, 2011.
S. Sinha et al., "WIND: Workload-Aware INtrusion Detection," in Recent Advances in Intrusion Detection, D. Zamboni and C. Kruegel, Eds. Springer Berlin Heidelberg, 2006.
L. Huang et al., "In-network PCA and anomaly detection," in In NIPS, 2006.
N. Goldenberg et al., "Accurate modeling of Modbus/TCP for intrusion detection in SCADA systems," Int. J. Crit. Infrastruct. Prot., vol. 6, No. 2, Jun. 2013.
M.-K. Yoon et al., "Communication Pattern Monitoring: Improving the Utility of Anomaly Detection for Industrial Control Systems," in Internet Society, San Diego, CA, USA, 2014.
N. Borisov et al., "Generic Application-Level Protocol Analyzer and its Language," Microsoft Research, MSR-TR-2005-133, Feb. 2005.
Zhipeng Zhao et al.; Systems and Methods for Identifying Message Payload Bit Fields in Electronic Communications; U.S. Appl. No. 15/359,076, filed Nov. 22, 2016.
"Transmission Control Protocol", http://en.wikipedia.org/wiki/Transmission_Control_Protocol, as accessed Jul. 10, 2014, Wikipedia, (Dec. 18, 2003).
A. Greenberg, "Hackers Remotely Kill a Jeep on the Highway—With Me in It," WIRED, Jul. 21, 2015. [Online]. Available: http://www.wired.com/2015/07/hackers-remotely-kill-jeep-highway/. [Accessed: Mar. 30, 2016].
Steven Noel et al., "Correlating Intrusion Events and Building Attack Scenarios Through Attack Graph Distances", Computer Security Applications Conference, 2004. $20^{th}$ Annual Tucson, AZ, USA Dec. 6-10, 2004, (Dec. 10, 2004), pp. 350-359.
Extending schedulability analysis of Controller Area Network (CAN) for mixed (periodic/sporadic) messages (http://ieeexplore.ieee.org/document/6059010/); Sep. 5, 2011.
A structured approach to anomaly detection for in-vehicle networks (http://ieeexplore.ieee.org/stamp/stamp.jsp?arnumber=5604050); Aug. 23, 2010.
Intrusion Detection Systems (IDS) Part 2—Classification; methods; techniques (http://www.windowsecurity.com/articles-tutorials/intrusion_detection/IDS-Part2-Classification-methods-techniques.html); Jun. 15, 2014.
Vishal Bajpai et al.; System and Method for Identifying an Invalid Packet on a Controller Area Network (CAN) Bus; U.S. Appl. No. 15/056,864, filed Feb. 29, 2016.
Vishal Bajpai et al.; Systems and Methods for Identifying Suspicious Controller Area Network Messages; U.S. Appl. No. 15/587,762, filed May 5, 2017.

\* cited by examiner

SYSTEMS AND METHODS FOR STRONG INFORMATION ABOUT TRANSMISSION CONTROL PROTOCOL CONNECTIONS

BACKGROUND

Networks of all kinds play an increasingly large role in computing for individuals and businesses. For individuals, getting reliable responses from a server may mean the difference between a seamless Internet experience and a frustrating one. A frustrated user may give up on a website or web service entirely, taking their business elsewhere. For enterprises, a dropped or refused connection may mean the loss or delay of a high-value transaction. In either case, it benefits enterprises to operate enough servers to ensure that connections are seldom or never refused. However, operating servers may be expensive in terms of both acquiring and maintaining an adequate number of servers.

Hardware constraints on traditional servers for hosting connections on servers may limit how many connections the servers may maintain at once. Such limitations may result in an enterprise acquiring and maintaining an ever-increasing number of servers. In some situations, limitations on the number of connections a server can host may be tied to the amount of memory available on the server to store information about network connections (e.g., transmission control protocol (TCP) connections). Accordingly, the instant disclosure identifies and addresses a need for additional and improved systems and methods for storing information about network connections.

SUMMARY

As will be described in greater detail below, the instant disclosure describes various systems and methods for storing information about transmission control protocol connections by using an alternative TCP stack that excludes information that may not be necessary for maintaining the connection.

In one example, a computer-implemented method for storing information about TCP connections may include (1) configuring a server with a TCP stack that is an alternative to a default TCP stack of an operating system of the server, (2) receiving, at the server, a request to establish a TCP connection with the server, (3) routing the request through the alternative TCP stack instead of the default TCP stack, and (4) storing, at the server via the alternative TCP stack, connection information about the TCP connection that excludes at least one item of information that would be stored by the default TCP stack.

The server may be configured in a variety of ways. In one embodiment, the server may include a long-poll server configured to keep the connection established by the request open while waiting for information requested by the request and may respond to the request once the information for the request has become available. In some embodiments, the request may include a hypertext transfer protocol request.

In some examples, configuring a server may include configuring the server with the alternative TCP stack in addition to the default TCP stack. In some examples, configuring the server may include configuring the server with a kernel driver that may implement the alternative TCP stack.

Additionally or alternatively, configuring the server may include configuring the server to route requests received via a specific port through the alternate TCP stack. In such examples, routing the request through the alternative TCP stack may include routing the request based on the port to which the request is addressed being a specific port designated for routing requests to the alternative TCP stack. In some examples, using the alternative TCP stack may enable the server to host a greater number of connections than the server would be able to host using the default TCP stack.

In one embodiment, the excluded information may include information that is not needed by any applications on the server. In some examples, the excluded information may include header information about the request. In one example, storing the connection information may include storing only (1) an Internet protocol address of a client that sent the request, (2) a port number of a client that sent the request, and/or (3) a TCP sequence number of a client that sent the request.

In one embodiment, a system for implementing the above-described method may include (1) a configuring module, stored in memory, that configures a server with a TCP stack that is an alternative to a default TCP stack of an operating system of the server, (2) a receiving module, stored in memory, that receives, at the server, a request to establish a TCP connection with the server, (3) a routing module, stored in memory, that routes the request through the alternative TCP stack instead of the default TCP stack, (4) a storing module, stored in memory, that stores, at the server via the alternative TCP stack, connection information about the TCP connection that excludes at least one item of information that would be stored by the default TCP stack, and (5) at least one physical processor configured to execute the configuring module, the receiving module, the routing module, and the storing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) configure a server with a TCP stack that is an alternative to a default TCP stack of an operating system of the server, (2) receive, at the server, a request to establish a TCP connection with the server, (3) route the request through the alternative TCP stack instead of the default TCP stack, and (4) store, at the server via the alternative TCP stack, connection information about the TCP connection that excludes at least one item of information that would be stored by the default TCP stack.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
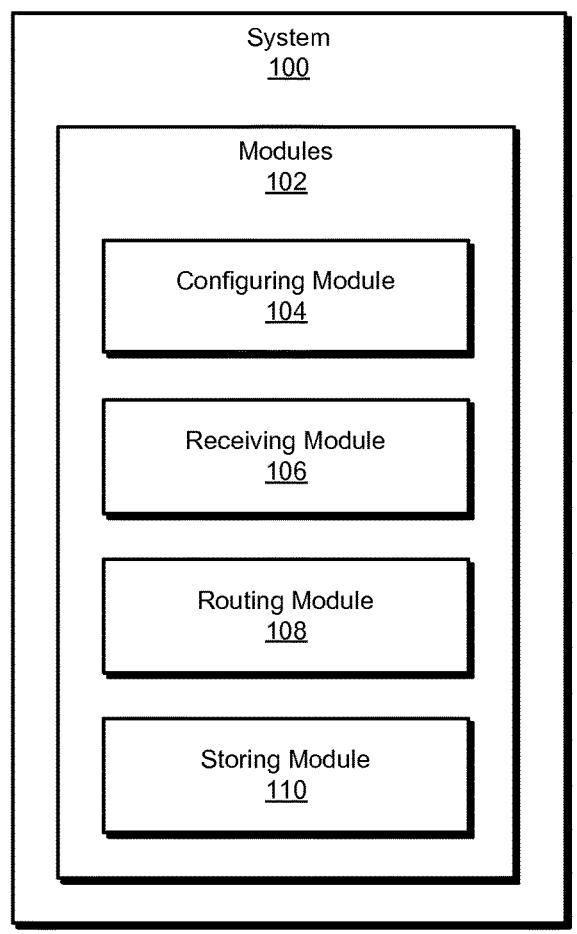
FIG. 1 is a block diagram of an exemplary system for storing information about transmission control protocol connections.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for storing information about transmission control protocol connections. As will be explained in greater detail below, by routing TCP connection requests through an alternative TCP stack that may more efficiently and/or effectively store information than a default TCP stack, the systems described herein may enable a server to host a greater number of TCP connections simultaneously. The systems and methods described herein may also provide various additional and/or alternative features and advantages.

Figure 2:
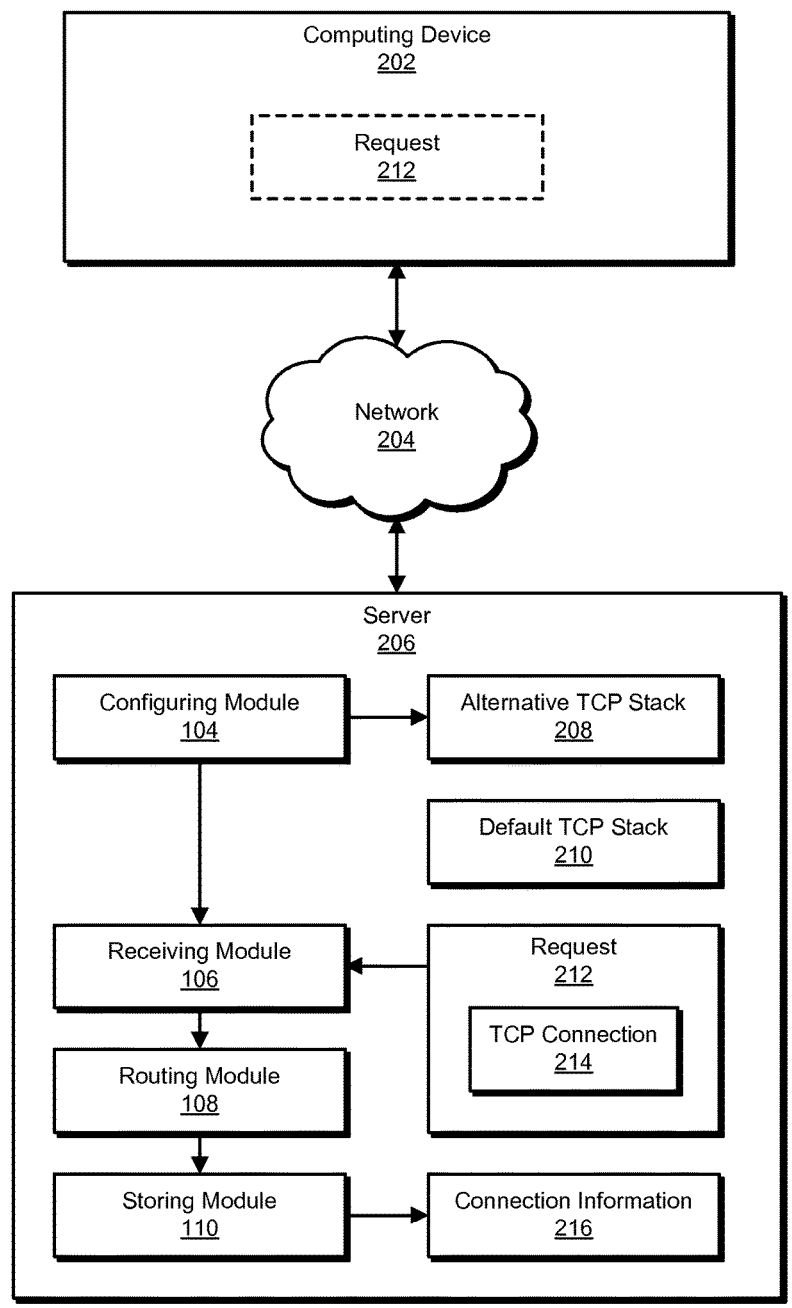
FIG. 2 is a block diagram of an additional exemplary system for storing information about transmission control protocol connections.
Figure 3:
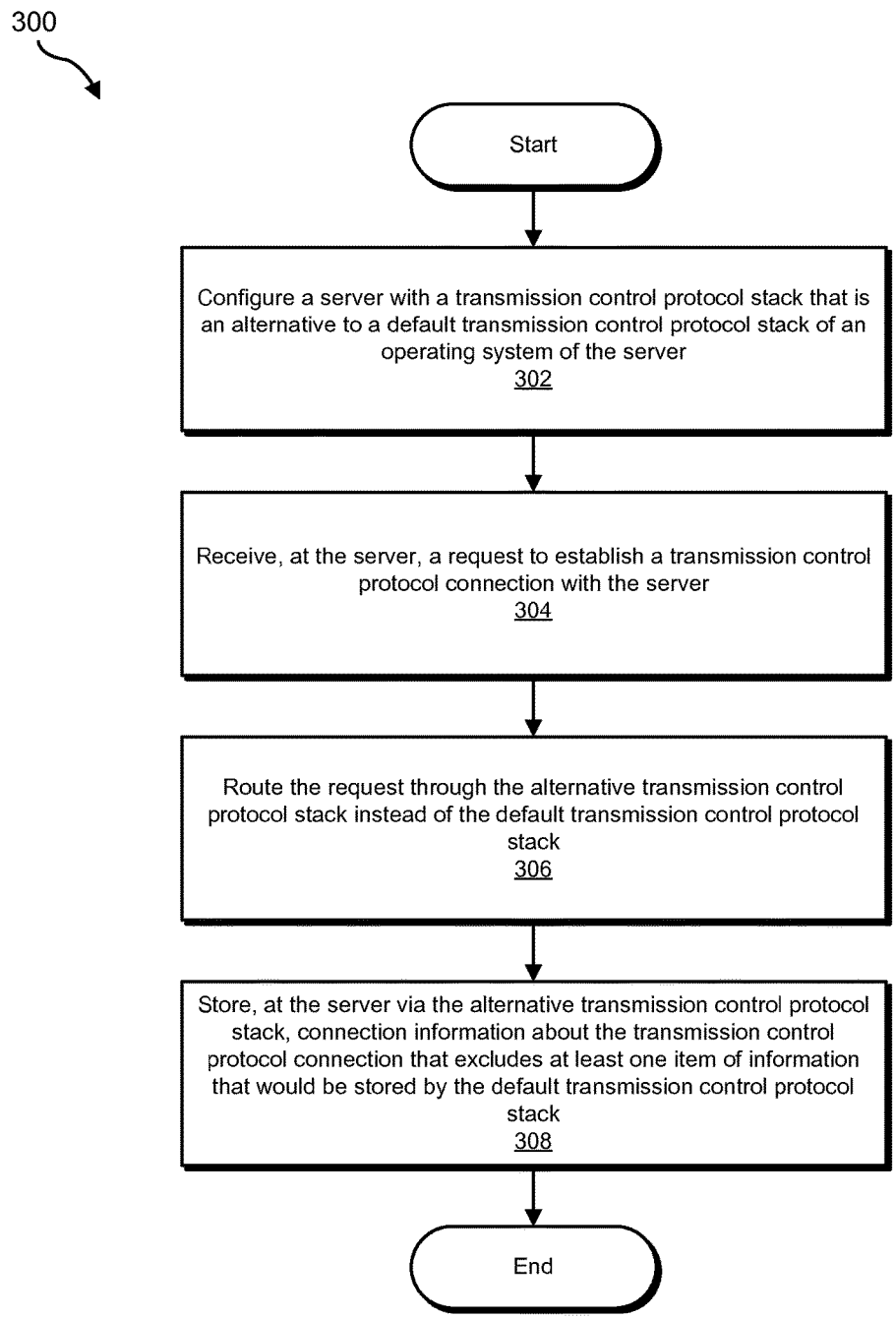
FIG. 3 is a flow diagram of an exemplary method for storing information about transmission control protocol connections.
Figure 4:
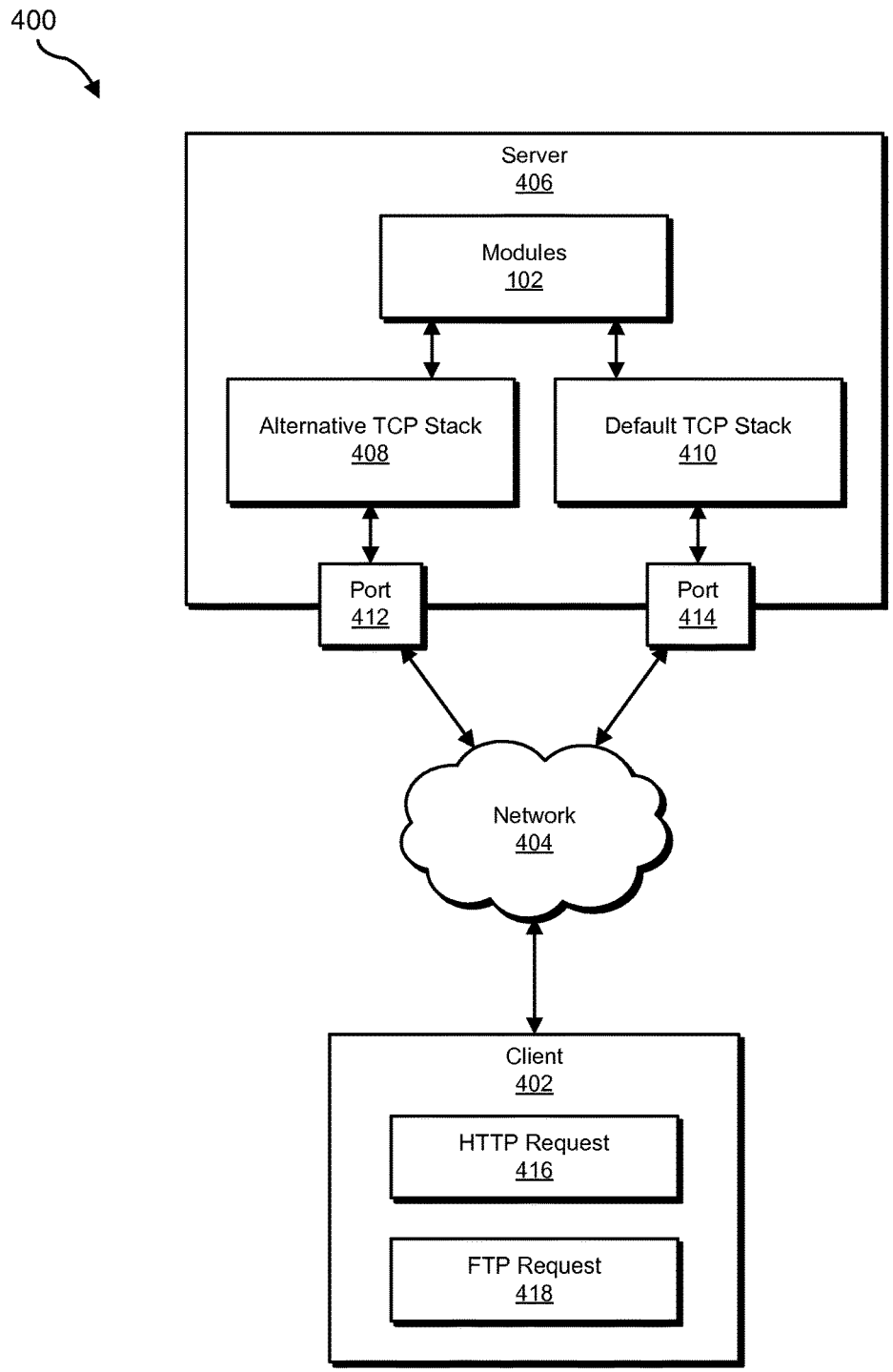
FIG. 4 is a block diagram of an exemplary computing system for storing information about transmission control protocol connections.

The following will provide, with reference to FIGS. 1, 2, and 4, detailed descriptions of exemplary systems for storing information about transmission control protocol connections. Detailed descriptions of corresponding computer-implemented methods will also be provided in connection with FIG. 3. Detailed descriptions of an exemplary TCP packet will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for storing information about TCP connections. As illustrated in this figure, exemplary system 100 may include one or more modules 102 for performing one or more tasks. For example, and as will be explained in greater detail below, exemplary system 100 may include a configuring module 104 that may configure a server with a TCP stack that may be an alternative to a default TCP stack of an operating system of the server. Exemplary system 100 may additionally include a receiving module 106 that may receive, at the server, a request to establish a TCP connection with the server. Exemplary system 100 may also include a routing module 108 that may route the request through the alternative TCP stack instead of the default TCP stack. Exemplary system 100 may additionally include a storing module 110 that may store, at the server via the alternative TCP stack, connection information about the TCP connection that excludes at least one item of information that would be stored by the default TCP stack. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Additionally or alternatively, server 206 may be programmed with one or more of modules 102.

In one embodiment, one or more of modules 102 from FIG. 1 may, when executed by at least one processor of server 206, enable server 206 to store information about TCP connections. For example, and as will be described in greater detail below, configuring module 104 may configure server 206 with a TCP stack 208 that is an alternative to a default TCP stack 210 of an operating system of server 206. Later, receiving module 106 may receive, at server 206, a request 212 to establish a TCP connection 214 with server 206. Next, routing module 108 may route request 212 through alternative TCP stack 208 instead of through default TCP stack 210. Finally, storing module 110 may store, at server 206 via alternative TCP stack 208, connection information 216 about TCP connection 214 that excludes at least one item of information that would be stored by default TCP stack 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of hosting TCP connections. Examples of server 206 include, without limitation, HTTP servers, application servers, and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for storing information about transmission control protocol connections. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may configure a server with a TCP stack that is an alternative to a default TCP stack of an operating system of the server. For example, configuring module 104 may, as part of computing device 202 in FIG. 2, configure server 206 with TCP stack 208 that is an alternative to default TCP stack 210 of an operating system of server 206.

The term "transmission control protocol stack" or "TCP stack," as used herein, generally refers to any code, script, module, series of modules, application, software, and/or hardware configured to process TCP connections. In some embodiments, a TCP stack on a server may store information about TCP connections hosted by the server.

The term "operating system," as used herein, generally refers to any software that manages resources and/or provides common services on a computing system. In some examples, an operating system may provide services such as a default TCP stack. Examples of operating systems may include WINDOWS SERVER 2012, OS X SERVER, UNIX, and/or LINUX.

Configuring module 104 may configure the server in a variety of ways and/or contexts. For example, configuring module 104 may configure the server by installing a module, plug-in, gem, script, or other container for code that includes code that describes an alternative TCP stack. In other examples, configuring module 104 may configure the server by running code that creates or otherwise implements the alternative TCP stack. In some examples, configuring module 104 may configure the server by installing, on the server, a kernel driver that includes the alternative TCP stack.

In some examples, configuring module 104 may configure a server by configuring the server with the alternative TCP stack in addition to the default TCP stack. For example, configuring module 104 may install a kernel driver that includes the alternative TCP stack and may not uninstall the default TCP stack.

The term "default TCP stack," as used herein, generally refers to any part of an operating system and/or other code that processes TCP connections. In some embodiments, a default TCP stack may include a TCP/IP stack. In some embodiments, a TCP/IP stack may include an application layer that encodes and/or decodes data for TCP transmission, a transport layer that performs host-to-host communications, an Internet layer that handles IP addresses, and/or a link layer that defines networking methods. In some embodiments, messages encoded with different protocols may be processed by different application layers and/or different default TCP stacks. In some embodiments, the alternative TCP stack may replace only some of the layers of the default TCP stack.

In one embodiment, the server may include a long-poll server configured to keep the connection established by keeping the request open while waiting for information requested by the request and responding to the request once the information for the request has become available. In some embodiments, the long-poll server may skip sending an empty response to a request at the time the request is received. In some examples, a long-poll server may keep connections open for a longer period of time than a server that responds to requests immediately. In some embodiments, a long-poll server may be used to simulate a push server. Examples of services that may use a long-poll server and/or push server may include news feeds, instant messaging applications, data transfer applications, mail servers, and/or monitoring services (e.g., antivirus and/or antimalware applications and services).

At step 304 one or more of the systems described herein may receive, at the server, a request to establish a TCP with the server. For example, receiving module 106 may, as part of computing device 202 in FIG. 2, receive, at server 206, request 212 to establish TCP connection 214 with server 206.

Receiving module 106 may receive the request in a variety of ways. In some embodiments, receiving module 106 may receive all incoming requests to the server. In some embodiments, receiving module 106 may receive requests directed to a specific port on the server and/or requests of a certain type. In one example, receiving module 106 may receive a hypertext transfer protocol (HTTP) request.

At step 306 one or more of the systems described herein may route the request through the alternative TCP stack instead of through the default TCP stack. For example, routing module 108 may, as part of computing device 202 in FIG. 2, route request 212 through alternative TCP stack 208 instead of default TCP stack 210.

Routing module 108 may route the request through the alternative TCP stack in a variety of ways and/or contexts. For example, routing module 108 may route the request based on the protocol of the request. In one example, routing module 108 may route file transfer protocol (FTP) requests through the default TCP stack and HTTP requests through the alternative TCP stack. In another example, routing module 108 may route all requests through the alternative TCP stack unless the request includes a flag specifying that the request be routed through the default TCP stack.

In one embodiment, configuring module 104 may configure the server by configuring the server to route requests received via a specific port through the alternate TCP stack. In such embodiments, routing module 108 may route the request through the alternative TCP stack by routing the request based on the port to which the request is addressed being the port specified for routing requests to the alternative TCP stack. FIG. 4 is a block diagram of an exemplary computing system 400 for storing information about transmission control protocol connections via an alternative TCP stack and/or a default TCP stack.

As illustrated in FIG. 4, a server 406 may be connected to a client 402 via a network 404. Server 406 may include modules 102, an alternative TCP stack 408, a default TCP stack 410, a port 412 and/or a port 414. Client 402 may send HTTP request 416 to port 412 on server 406. Server 406 may be configured to route requests directed at port 412 through alternative TCP stack 408. Client 402 may also send FTP request 418 to port 414 on server 406. Server 406 may be configured to route requests directed at port 414 through default TCP stack 410. In some examples, server 406 may also include additional ports that may be configured to route requests to alternative TCP stack 408 and/or default TCP stack 410.

Returning to FIG. 3, at step 308 one or more of the systems described herein may store, at the server via the alternative transmission control protocol stack, connection information about the transmission control protocol connection that excludes at least one item of information that would be stored by the default transmission control protocol stack. For example, storing module 110 may, as part of computing device 202 in FIG. 2, store, at server 206 via alternative TCP stack 208, connection information 216 about TCP connection 214 that excludes at least one item of information that would be stored by default TCP stack 210.

Storing module 110 may store the connection information in a variety of ways. For example, storing module 110 may store the connection information in kernel memory, in a map, in a linked list, in an array, and/or in any other suitable data structure.

Figure 5:
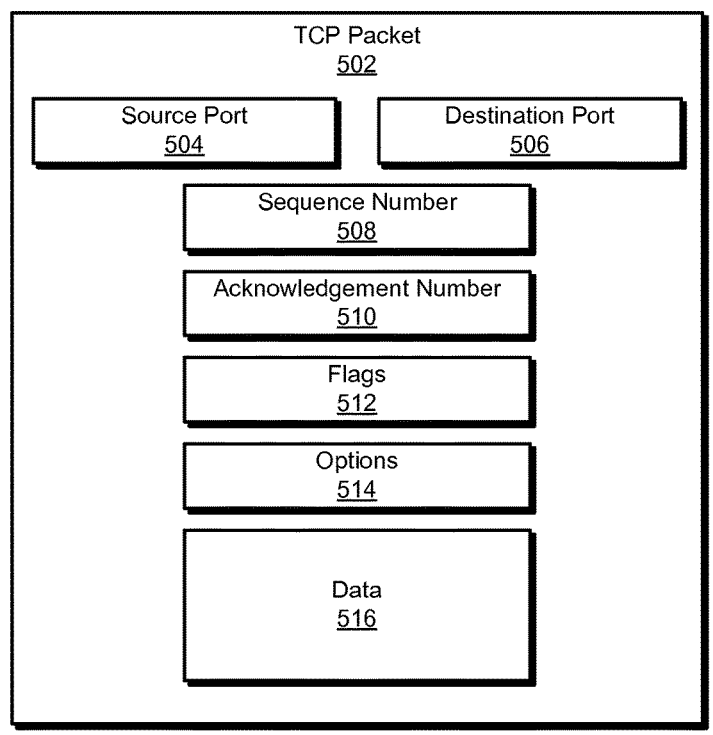
FIG. 5 is a block diagram of an exemplary transmission control protocol packet.

Storing module 110 may store the connection information by excluding some of the information included in a TCP packet. FIG. 5 is a block diagram of an exemplary TCP packet 502. As illustrated in FIG. 5, TCP packet 502 may include the number of source port 504, the number of destination port 506, sequence number 508, acknowledgement number 510, flags 512, options 514, and/or data 516. In some embodiments TCP packet 502 may also include additional fields such as a data offset, a reserved field, a window, a checksum, and/or an urgent pointer.

In some examples, storing module 110 may store the connection information by storing only (1) an Internet protocol (IP) address of a client that sent the request, (2) a port number of a client that sent the request, and/or (3) a transmission control protocol sequence number of a client that sent the request. For example, storing module 110 may store only source port 504, sequence number 508, and the IP address of a client that sent the request including TCP packet 502.

In one embodiment, the at least one item of excluded information may include header information about the request. For example, storage module 110 may exclude header information from the HTTP request. Additionally or alternative, storage module 110 may exclude header information from the TCP header such as the destination port, acknowledgement number, flags, and/or options.

In some examples, the excluded information may include information that is not needed by any applications on the server. For example, the destination port to which the request was addressed may not be needed by any applications once the request has been received.

In some examples, using the alternative TCP stack may enable the server to host a greater number of connections than the server would be able to host using the default TCP stack. In some embodiments, the information stored by the alternative TCP stack may have a much smaller memory footprint than the information stored by the default TCP stack and thus the server may be able to store information for more TCP connections in a smaller amount of memory. For example, the default TCP stack in LINUX servers may require up to four kilobytes of space to store TCP connection information. In this example, an alternative TCP stack may be able to reduce the required space significantly by storing less than a kilobyte of information.

As described in connection with method 300 above, the systems described herein may allow a server to host more TCP connections than may otherwise be possible by routing requests for connections through an alternative TCP stack that may store a reduced set of information about the connection. In some embodiments, the server may be an HTTP long-poll server which may respond to requests only when requested information has become available and may thus keep TCP connections open for a longer period of time than typical servers. By hosting more TCP connections on fewer servers, the systems described herein may reduce the need for additional servers in enterprise data centers to host numerous concurrent connections. For example, an endpoint security server may be able to host numerous concurrent connections from endpoints with security (e.g., antivirus) agents installed and may be able to efficiently and effectively send antimalware signatures and/or other security updates to the endpoints.

Figure 6:
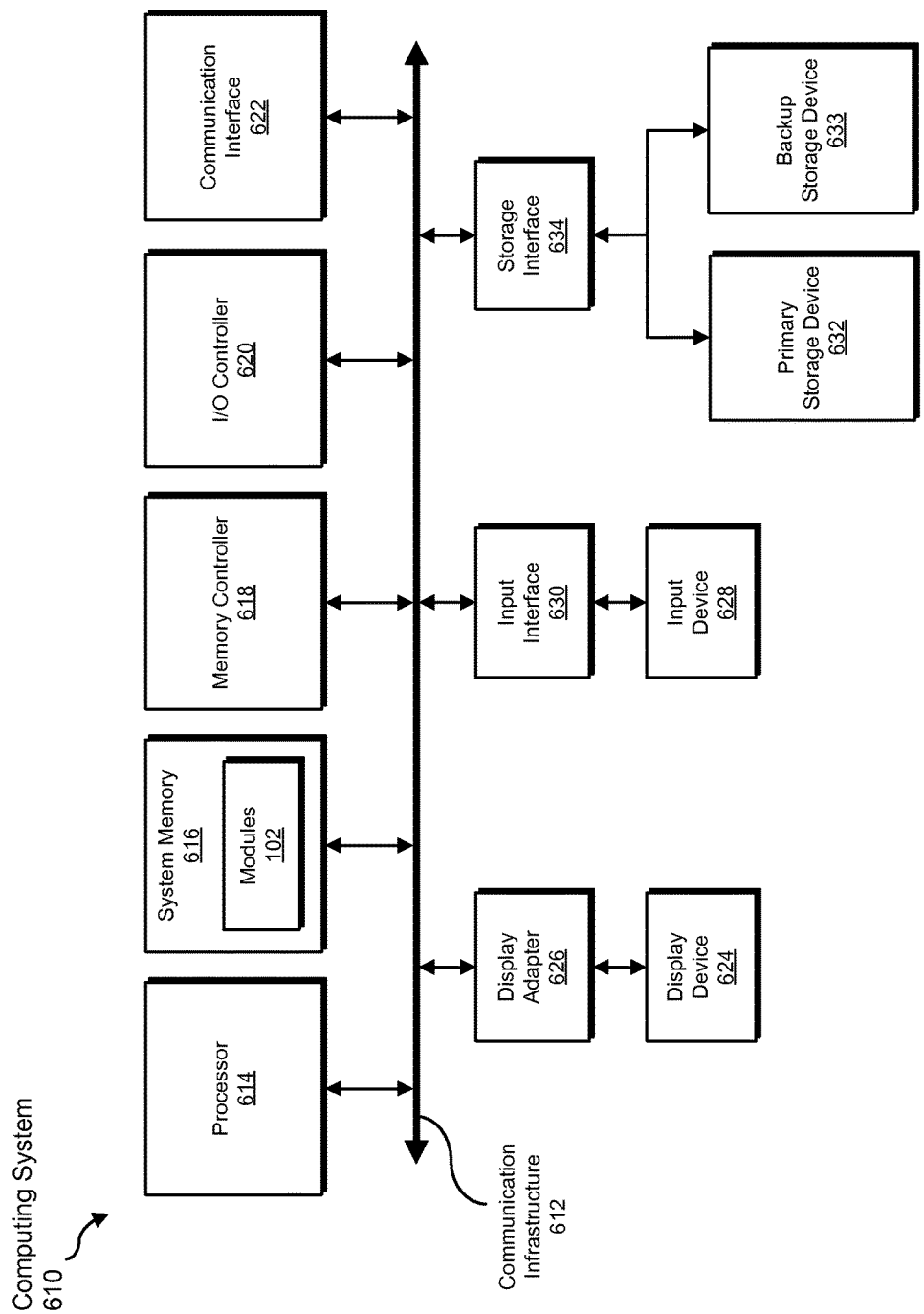
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
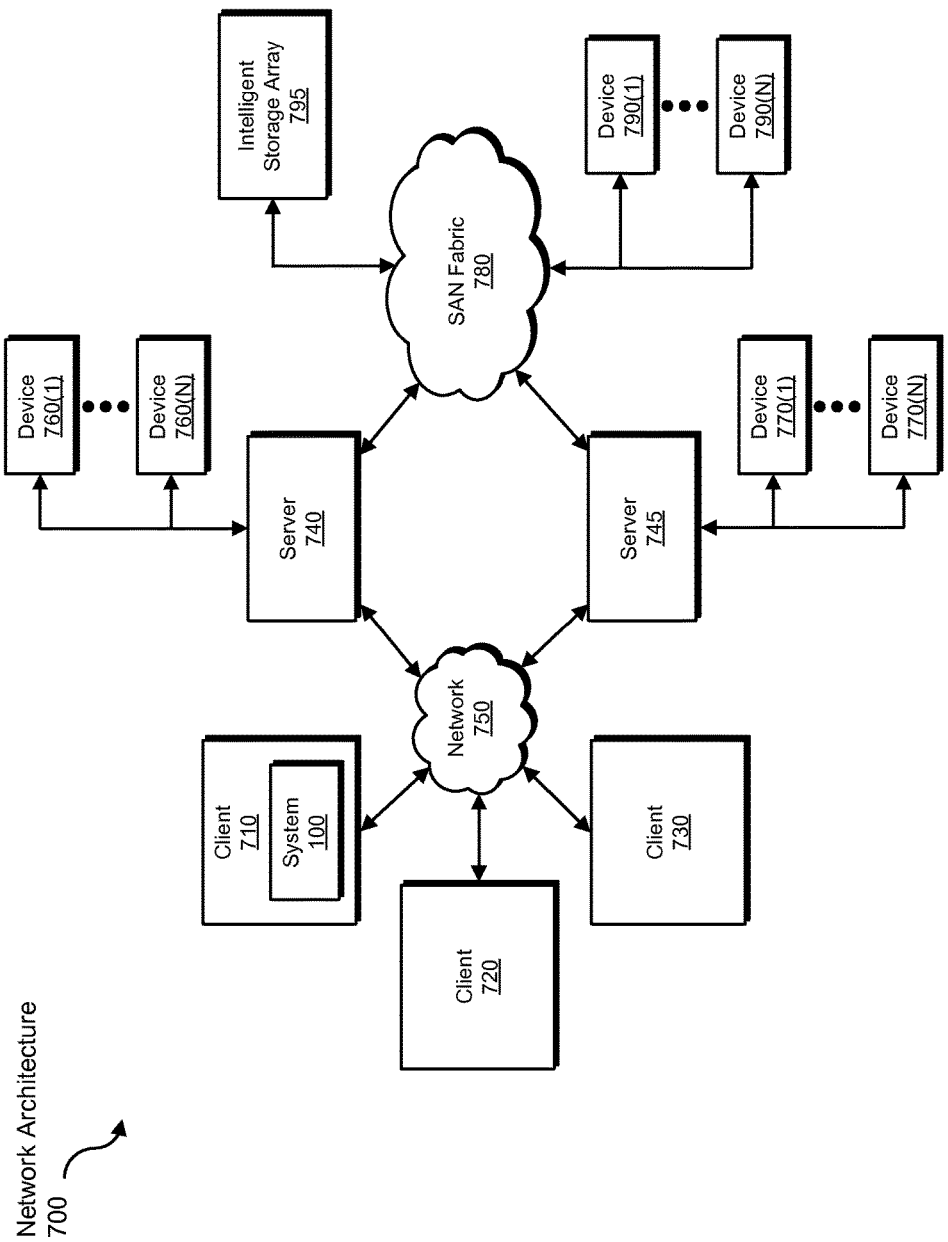
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for storing information about transmission control protocol connections.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, antimalware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive connection data to be transformed, transform the connection data, output a result of the transformation to a server, use the result of the transformation to maintain a connection, and store the result of the transformation to a table, map, and/or other data structure. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for storing information about transmission control protocol connections, at least a portion of the method being performed by a computing device comprising at least one processor, the method comprising:

configuring a server with a transmission control protocol stack that is an alternative to a default transmission control protocol stack of an operating system of the server, wherein the default transmission control protocol stack is programmed to store a default set of connection information about transmission control protocol connections established through the default transmission control protocol stack;

receiving, at the server, a request to establish a transmission control protocol connection with the server;

routing the request through the alternative transmission control protocol stack instead of the default transmission control protocol stack; and storing, at the server via the alternative transmission control protocol stack, connection information used by the transmission control protocol to maintain the transmission control protocol connection, wherein:

the connection information includes an Internet protocol address of a client that sent the request, a port number of the client that sent the request, and a transmission control protocol sequence number of the client that sent the request; and the connection information excludes header information about the request such that the connection information has a smaller memory footprint than the default set of connection information.

2. The computer-implemented method of claim 1, wherein the server comprises a long-poll server configured to:

keep the transmission control protocol connection established by the request open while waiting for information requested by the request; and respond to the request once the information for the request has become available.

3. The computer-implemented method of claim 1, wherein the header information is included within the default set of connection information.

4. The computer-implemented method of claim 1, wherein configuring the server comprises configuring the server with the alternative transmission control protocol stack in addition to the default transmission control protocol stack.

5. The computer-implemented method of claim 1, wherein configuring the server comprises configuring the server to route requests received via a specific port through the alternative transmission control protocol stack.

6. The computer-implemented method of claim 5, wherein routing the request through the alternative transmission control protocol stack comprises routing the request based on a port to which the request is addressed being the specific port designated for routing requests to the alternative transmission control protocol stack.

7. The computer-implemented method of claim 1, wherein using the alternative transmission control protocol stack enables the server to host a greater number of connections than the server would be able to host using the default transmission control protocol stack.

8. The computer-implemented method of claim 1, wherein configuring the server comprises configuring the server with a kernel driver that comprises the alternative transmission control protocol stack.

9. The computer-implemented method of claim 1, wherein information that is within the default set of connection information but is excluded from the connection information comprises information that is not needed by any applications on the server.

10. The computer-implemented method of claim 1, wherein the request comprises a hypertext transfer protocol request.

11. A system for storing information about transmission control protocol connections, the system comprising:

a configuring module, stored in memory, that configures a server with a transmission control protocol stack that is an alternative to a default transmission control protocol stack of an operating system of the server, wherein the default transmission control protocol stack is programmed to store a default set of connection information about transmission control protocol connections established through the default transmission control protocol stack;

a receiving module, stored in memory, that receives, at the server, a request to establish a transmission control protocol connection with the server;

a routing module, stored in memory, that routes the request through the alternative transmission control protocol stack instead of the default transmission control protocol stack;

a storing module, stored in memory, that stores, at the server via the alternative transmission control protocol stack, connection information used by the transmission control protocol to maintain the transmission control protocol connection, wherein:

the connection information includes an Internet protocol address of a client that sent the request, a port number of the client that sent the request, and a transmission control protocol sequence number of the client that sent the request; and the connection information excludes header information about the request such that the connection information has a smaller memory footprint than the default set of connection information; and at least one physical processor configured to execute the configuring module, the receiving module, the routing module, and the storing module.

12. The system of claim 11, wherein the server comprises a long-poll server configured to:

keep the transmission control protocol connection established by the request open while waiting for information requested by the request; and respond to the request once the information for the request has become available.

13. The system of claim 11, wherein the header information is included within the default set of connection information.

14. The system of claim 11, wherein the configuring module configures the server by configuring the server with the alternative transmission control protocol stack in addition to the default transmission control protocol stack.

15. The system of claim 11, wherein the configuring module configures the server by configuring the server to route requests received via a specific port through the alternative transmission control protocol stack.

16. The system of claim 15, wherein the routing module routes the request through the alternative transmission control protocol stack by routing the request based on a port to which the request is addressed being the specific port designated for routing requests to the alternative transmission control protocol stack.

17. The system of claim 11, wherein the alternative transmission control protocol stack enables the server to host a greater number of connections than the server would be able to host using the default transmission control protocol stack.

18. The system of claim 11, wherein the configuring module configures the server by configuring the server with a kernel driver that comprises the alternative transmission control protocol stack.

19. The system of claim 11, wherein information that is within the default set of connection information but is excluded from the connection information comprises information that is not needed by any applications on the server.

20. A non-transitory computer-readable medium comprising one or more computer-readable instructions that, when executed by at least one processor of a computing device, cause the computing device to:

configure a server with a transmission control protocol stack that is an alternative to a default transmission control protocol stack of an operating system of the server, wherein the default transmission control protocol stack is programmed to store a default set of connection information about transmission control protocol connections established through the default transmission control protocol stack;

receive, at the server, a request to establish a transmission control protocol connection with the server;

route the request through the alternative transmission control protocol stack instead of the default transmission control protocol stack; and store, at the server via the alternative transmission control protocol stack, connection information used by the transmission control protocol to maintain the transmission control protocol connection, wherein:

the connection information includes an Internet protocol address of a client that sent the request, a port number of the client that sent the request, and a transmission control protocol sequence number of the client that sent the request; and the connection information excludes header information about the request such that the connection information has a smaller memory footprint than the default set of connection information.

* * * * *